Figure 1:
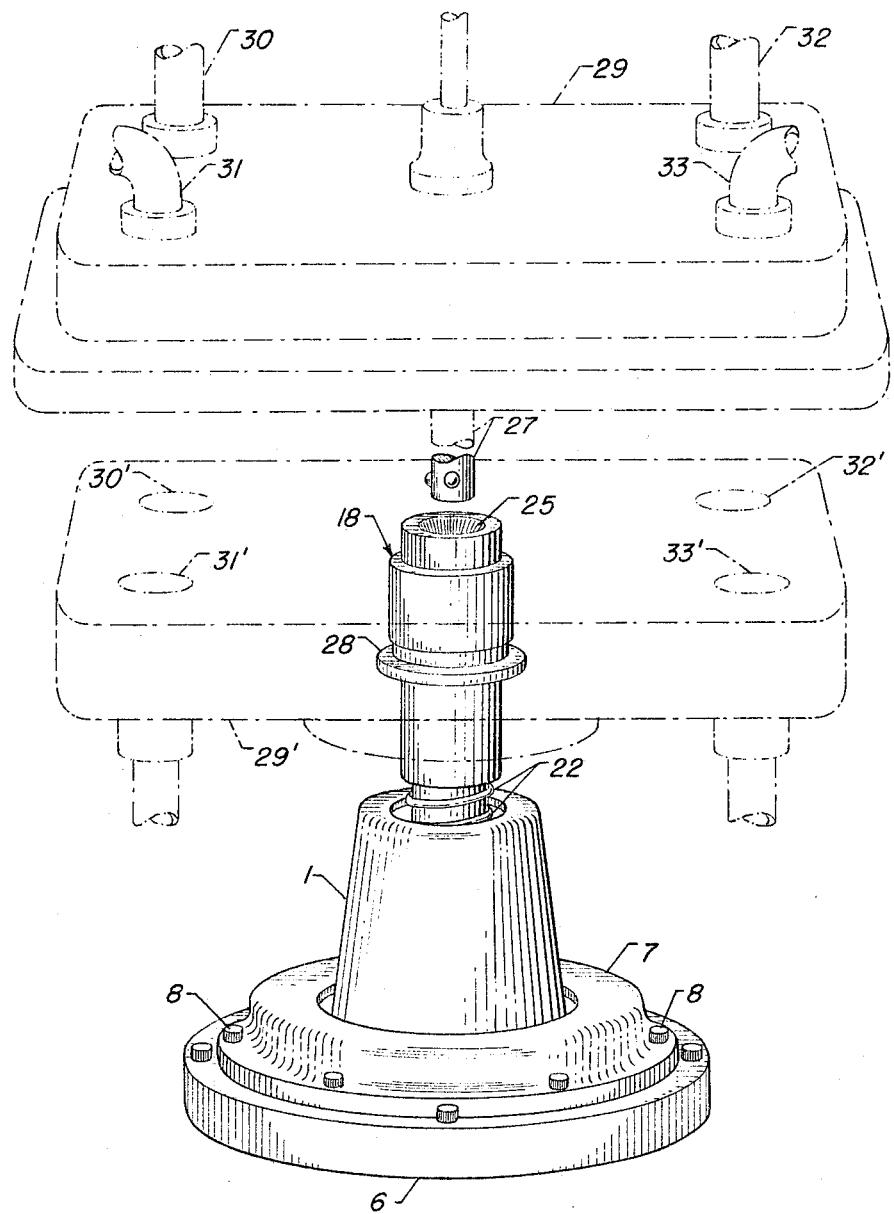

Aug. 23, 1966  J. V. OLIVEAU  3,268,193
MOVABLE DISCONNECT SUPPORT
Filed Oct. 23, 1964  2 Sheets-Sheet 1

INVENTOR:
John V. Oliveau

BY: *James R. Hoatson Jr.*
*Philip T. Liggett*
ATTORNEYS

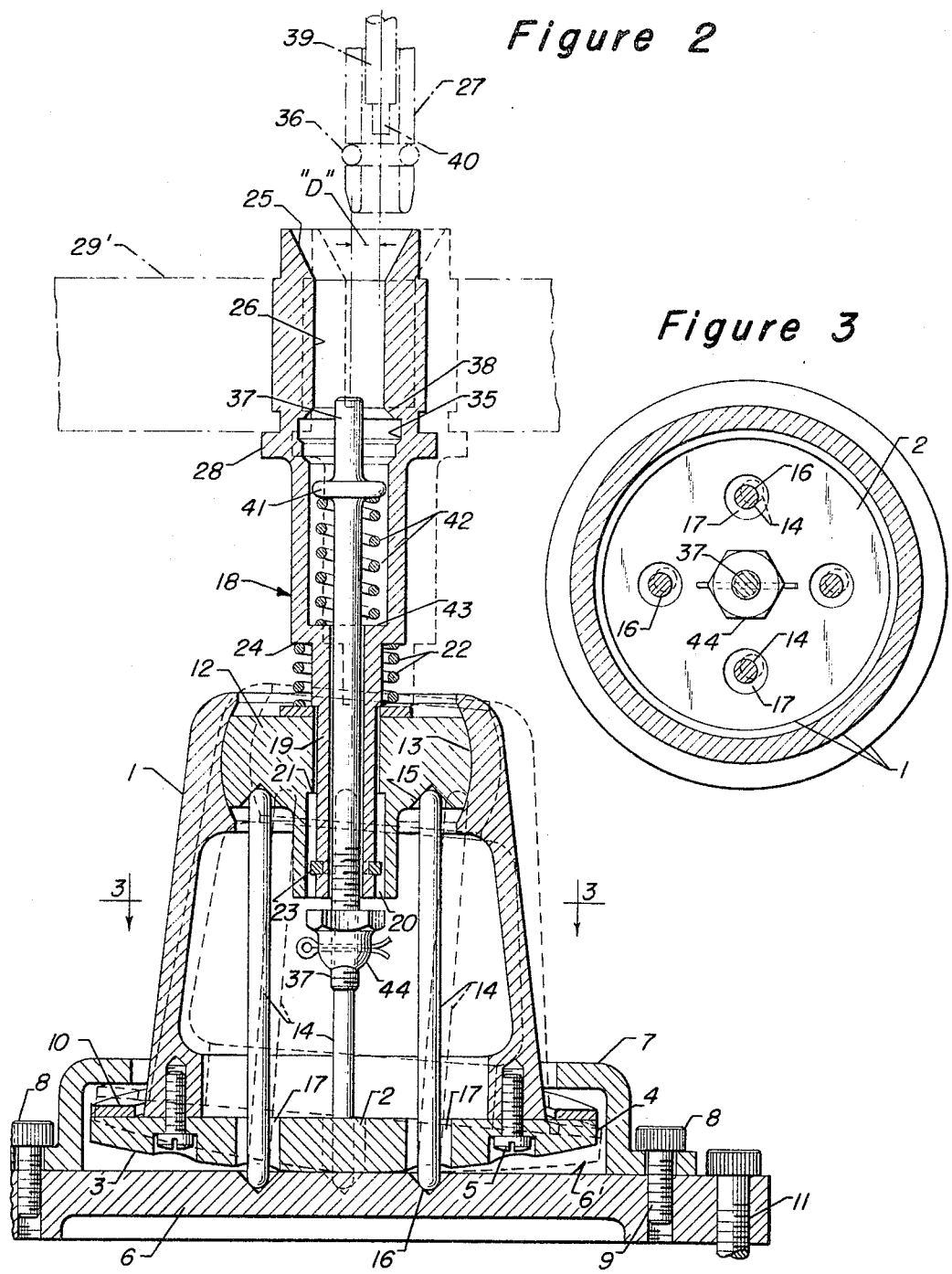

United States Patent Office 3,268,193
Patented August 23, 1966

3,268,193
MOVABLE DISCONNECT SUPPORT
John V. Oliveau, Greenwich, Conn., assignor to Universal Oil Products Company, Des Plaines, Ill., a corporation of Delaware
Filed Oct. 23, 1964, Ser. No. 405,975
4 Claims. (Cl. 248—158)

This invention is directed to a movable or translatable support for the disconnect means used with personnel in an aircraft or other fast moving vehicle.

More particularly, the invention is directed to a disconnect support unit that is constructed to provide a small limited movement in any direction so as to assist in the alignment between the upper and lower portions of a disconnect in an aircraft.

A typical disconnect has separable block portions which connect together, as well as automatically detach from one another, to provide for the engagement of air and oxygen supply lines and various control lines between the aircraft and the pilot. One block portion has supply and control lines leading to the pilot, and thus must disconnect and accompany the pilot, or his capsule type of encasement, when a pilot is ejected for any reason. The aircraft end or base portion of the disconnect is arranged to be attached directly to the aircraft and have the various connection means for the supply and control lines leading respectively from the supply sources or to the control units.

Where the pilot is in a pressurized suit and there can be a manual engagement of the disconnect block portions, there is generally no need to have a movable disconnect support to assist in the alignment of the upper and lower block portions of the device. However, where the pilot is encased in a capsule which must be lifted and guided in and out of a carrier, then there is need to have a support for an aircraft end portion of the disconnect which will move laterally or translate at least a small distance to assist in effecting the alignment and final engagement of the two separate disconnect portions.

It is thus a principal object of the present invention to provide a special self-aligning disconnect support that maintains the mating face of the aircraft or supported half of the disconnect parallel with that of the opposing mating face of the disconnectable seat or capsule block portion.

It is a further object of the present invention to provide a disconnect support or base unit that utilizes equal length spacer rods to permit lateral movement or translation of a top portion thereof having a disconnect supporting stem to maintain the latter in a position parallel with its initial plane regardless of imparted lateral displacement.

Briefly, the disconnect support unit of the present invention is adapted for attachment with the lower block portion of a disconnect device, as well as for attachment with the aircraft, with such unit comprising in combination, a rounded bottom rockable support frame having a substantially open or hollow interior portion and in addition having a plurality of spaced apart passageways through the bottom portion thereof, with such rounded bottom support frame being removably held in a rocking position on a flat topped base plate having means adapted for the attachment of the unit to the aircraft, a movable ball support member, the latter being encased in an upper socket portion of the support frame at a spaced distance from the base plate, a plurality of spaced apart spacer-guide pins pivotally held by an extending between socket means in the lower portion of the ball support member and in the top of the flat topped base plate, said pins extending through the passageways in the bottom portion of the rounded bottom support frame whereby the ball supported member is held in parallel positioning with respect to the top of the base plate as said support frame has its top portion translate with respect to the base plate, a tubular form of disconnect support stem held by and extending axially through the center portion of the ball member and a wide-mounted tapered inlet opening within the upper portion of said support stem whereby to provide for the guiding of a removable upper disconnect portion into alignment with the lower disconnect portion that is held by said support stem.

In a preferred construction and arrangement, the support stem extending through the upper ball member of the support frame is constructed and arranged to serve not only as an alignment means by virtue of the tapering inlet opening, but, in addition, provides for holding and locking a guide member from an upper block portion of the disconnect device. Inasmuch as the upper portion of the disconnect device may approach the lower block portion of the disconnect and its disconnect support with a slight misalignment, then it is necessary that the support unit be adaptable for translating and moving as necessary in making proper alignment in any direction. Also, in order to preclude binding or damage to any of the supply line portions, then it is necessary that the faces of the upper and lower block portions of the disconnect be quite parallel with one another. In other words, it is desirable that the support stem, as provided by the present improved support base, maintain a position which is at right angles, or normal, to the face of an upper disconnect portion being lowered to engage the aircraft end of the disconnect device. The simplified and novel arrangement of the present support base is of particular advantage in that it readily permits translation or lateral movement of the support stem while at the same time retaining it in a vertical position through an upper movable ball support member that maintains its outer face in a plane parallel with the pilot seat or capsule portion of the disconnect.

Reference to the accompanying drawings and the following descriptions thereof will serve to more clearly point out the advantageous and novel construction features of the support unit.

FIGURE 1 of the drawing is an external perspective view indicating the improved form of disconnect support unit as well as a diagrammatic indication of upper and lower portions of a disconnect device of the type which may be readily supported by the movable form of a support unit.

FIGURE 2 of the drawing is a sectional elevational view through the disconnect support unit, indicating how the upper support stem portion may translate laterally.

FIGURE 3 of the drawing is a sectional plan view through the lower portion of the disconnect support frame.

Referring now to the drawing, there is shown a hollow frusto-conical frame section 1 with a lower section 2 having a rounded bottom surface 3 and an extended flange or shelf portion 4. For purposes of assembly, the lower section 2 is shown attached to the bottom of support frame 1 by a plurality of spaced cap screws 5. Below the lower section 2 is a suitable flat-topped base plate 6 which accommodates the rocking movement of the superimposed support frame by virtue of the lower rounded surface 3. A suitable retaining flange 7 is removably mounted on the top surface 6' of the base plate 6 by cap screws 8 into threaded portions 9 in the base plate. An upper inwardly projecting portion of the retaining flange 7 is constructed so as to be spaced a short distance above the extended flange portion 4 of the lower section 2. Thus, through the use of a wave type of washer 10 there can be a slight amount of compressive action between the lower surface of the flange 7 and the top surface of the projecting flange 4 to urge the lower section 2 to remain in a plane substantially parallel with the base plate face 6' and the retaining flange 4. Suitable holes 11 are provided around the periphery of the base plate 6 to in turn permit a bolted attachment of the entire support unit to an aircraft or other vehicle.

Within the upper portion of the support frame 1, there is provided a ball support member 12 having a partial spherical outer surface which is adapted to fit within a socket portion 13 of the support frame 1. Although not shown in the drawing, the support frame may be constructed of two or more parts and have suitable bolting means or clamping ring means such that there may be the assembly and removability of the ball member 12 from the interior socket portion 13. Also, suitable means, not shown, may be provided to effect the lubrication of the surfaces between the ball support member 12 and the face of the socket portion 13 such that there may be a relatively friction-free movement of the ball member within the socket.

In accordance with the present embodiment of the invention, there are provided a plurality of spacer-guide pins 14 which extend from small socket means 15 in the lower face of the ball support member 12 into opposing small socket means or recesses 16 provided in the upper face of the base plate 6. Suitable passageway openings 17 are provided through the lower section 2 of the support frame, with such passageway openings being in alignment with the upper and lower socket means 15 and 16 to permit both the passage and lateral movement of the guide pins 14. Although it may be explained more fully hereinafter, it will be seen that the spacer-guide pins 14 will serve to cause the upper ball member 12 to stay in a horizontal plane with respect to the base plate face 6'. Stated in another way, the pins 14 will serve to maintain a vertical positioning for an axially positioned support stem member 18 which is removably held within the center of the support member 12.

In the operation of the unit, as the upper part of the support frame is moved laterally, there is a rocking of the bottom surface 3 on the top of the base plate face 6' and simultaneously a tipping or leaning of the plurality of spacer-guide pins 14 to cause end forces in the sockets 15 and 16 and the forcing of the ball support member 12 to maintain itself in a plane that is parallel with the base plate face 6'.

The disconnect support stem may be constructed and arranged of various designs; however, in the present embodiment, the stem 18 is provided with a lower shaft portion 19 that extends into a bore center hole portion of the ball member 12 and held in place by a sleeve member 20 against a shoulder section 21 by a spring 22. For assembly purposes, the holding sleeve 20 is attached to the shaft portion 19 by a suitable keying means 23. The spring 22 is of the compression type positioned externally around the shaft portion 19 and below an offset or shoulder 24 such that force applied between the latter and the top of the ball member 12 holds the entire support stem 18 in a yieldable vertical position within such ball support member. The upper end of the support stem 18 is provided with an enlarged tapered opening 25 and an interior bored-out section 26 adapted to accommodate the end of an aligning and locking shaft, such as shown by the dashed lines 27, from an upper block portion of a disconnect device. A lower block portion of a disconnect device is attached to the outer external periphery of the support stem 18, above a flange section 28, as shown by the dashed lines 29' extending laterally therefrom.

With particular reference to the diagrammatic perspective view in FIGURE 1 of the drawing, there is shown a lower block section 29' extending laterally from the upper portion of the support stem 18 in a position to accommodate or engage with an upper block portion 29 of a disconnect device. The latter is provided with various control or supply lines such as 30, 31, 32 and 33 which in turn effect engagement with corresponding control or supply lines from the lower portion of block 29' so as to communicate with the various pertinent portions of the aircraft. For example, one or more of the supply lines may be used to provide air and oxygen to the pilot while other lines may be electrical in nature in order to provide heating of the pilot or to control various portions of equipment from the pilot while he is in confining capsule.

FIGURE 1 of the drawing also indicates the end of an upper shaft member 27 entering the tapered inlet opening 25 within the upper portion of support stem 18. It will be seen by particular reference to FIGURE 2 of the drawing that the tapered opening 25 is adapted to help provide for the alignment between an upper shaft portion 27 and the interior of the support stem 18. In other words, as the lower end of the shaft 27 enters the widemouthed upper portion of opening 25 it will slide against the tapering surface thereof and cause the upper portion of the stem 18, as well as the top portion of the frame 1, to translate or move laterally to accommodate further introduction of the shaft 27 into the opening 26. As long as there is easy rotation of the ball member 12 within the top portion of the support frame 1 and an easy rocking of the lower section 2 of the support frame with the rounded surface 3, there will be the necessary lateral translation of the support stem. At the same time the stem 18 will be held in a vertical position to permit straight axial alignment with shaft 27 by virtue of the spacer-guide pins 14 effecting the necessary slight angular rotation and tipping of the ball member 12 in the support frame 1.

As indicated hereinabove, where the upper block portion of a disconnect device is engaged manually, there is no particular problem in effecting the alignment and insertion of the locking means and the control and supply line connection means to cause a final engagement; however, where the upper block portion of a disconnect device is required to be connected to a capsule or other pilot encasement means that may be mechanically lowered into place, then there is a problem from misalignment of the disconnect portions, with a need to provide lateral correction. A preferred embodiment of the support device also provides means for effecting a locking of the upper and lower portions of the disconnect device. Thus, as best shown by FIGURE 2 of the drawing, there is provision in stem portion 18 to have an internal groove or recess 35 which will accommodate locking means such as movable balls 36 within small lateral openings at the lower end of shaft 27. In the operation of the locking means, the lower end of the shaft 27 passes downwardly through the passageway 26 such that the balls 36 come into lateral alignment with the groove 35 and are pushed out by a locking pin member 37 to prevent the withdrawal of the shaft from the top opening of the stem 18. In other words, the ball members 36 will bear against an upper sloping section 38 to preclude the withdrawal of shaft 27. On the other hand, where it is desired to effect the release the upper portion of the disconnect by the withdrawal of the alignment and locking shaft 27, there can be a downward pressure and movement exerted by an internal release rod 39 which in turn pushes locking pin 37 downwardly to permit lateral alignment of balls 36 with the smaller diameter pin or shoulder section 40 of rod 39, whereby the balls 36 can move internally out from under the shoulder portion 38 of stem 18 to in turn permit withdrawal of the entire shaft member 27.

The locking pin 37, in the stem portion 18, is provided with a flange or shoulder section 41 to accommodate a compression spring 42 positioned internally in the support stem between the inside shoulder 43 and the lower face of flange 41. The lower end of the pin 37 continues on through a hollow bored hole in shaft section 19 to connect with a nut 44 at the lower end thereof. The removable nut 44 on the threaded end of the elongated pin 37 permits the removal of the latter and the assembly of the spring member 42 within the interior of the support stem 18.

In the operation of the releasing mechanism it will be seen that the pushing down of the upper release pin of shaft 27 will in turn push down the locking pin 37 against the action of spring 42 to permit the release of the ball members 36 from the groove 35. Conversely, in effecting the engagement between the shaft 27 and the support stem 18, it will be seen that the upper end of the locking pin 37 automatically pushes the ball members 36 outwardly from their horizontal passageways into the groove 35 as the lower end of the shaft 27 carries the balls to that elevation. A suitable removable thin sleeve member, not shown, may be utilized to hold the ball members within the confines of the exterior periphery of shaft 27 prior to its insertion into inlet opening 25 and passageway 26 at the upper end of the support stem 18. It should be noted that an internal groove or recess 35 in the support stem 18 can be used to accommodate various expandable or outwardly movable locking means from an insertable alignment and locking shaft, rather than movable ball members 36. The upper end portion of the locking pin member in the stem 18 should, of course, be designed to initiate and effect the locking of the shaft and upper disconnect portion with the stem.

The construction and arrangement of the illustrated embodiment shows four guide pins 14 to maintain the parallel plane effect between the ball support member 12 and the base plate 6. However, where desired, a greater number of spacer-guide pins may be utilized to effect the spacing, or alternatively, a minimum of three pins may be provided to effect a spacing between the upper ball and lower plate portions of support units. Each of the pins must necessarily be strong enough to act as compression members as they have their top end portions subjected to translation or lateral movement along with the ball member from the action of an aligning and locking shaft coming into engagement with the inlet end of the support stem. Also, since both the upper and lower end portions of the guide pins 14 must be free to move in any direction, they are necessarily encased in suitable recess or socket means that will permit rotative movement rather than use hinged or pinned connections.

It may be further noted that the present embodiment utilizes a wave form of washer 10 to effect compressive forces between the upper face of the flange 4 and the lower face of the retaining flange 7 such that there is normal vertical positioning of the support frame 1 with respect to the base plate 6; however, other spring means, such as a plurality of spaced coiled compression springs, could be utilized between the opposing faces of flange 4 and flange 7 to effect the equalization and normal positioning of the support frame 1 with respect to the base 6. Still other means for effecting assembly of the parts of the support frame, or the support stem 18 with respect to the ball support member 12, may be embodied within the present invention without departing from the broad scope of the improved method of accommodating misalignment in any direction while simultaneously maintaining the proper normal or vertical positioning of the support stem 18 to preclude its binding when engaging with an upper disconnect block portion.

Where the base plate member 6 is to be attached to a sloping floor section, then such plate may be of a wedge shape or utilized in combination with a wedge form of filler member. In the case where the support unit is to be mounted to the side portion of an aircraft structure, then there may be used a suitable angle bracket to insure that the bearing surface 6' and the stem 18 are in proper positions to hold the face of the lower disconnect block portion 29' in a plane parallel with the lower face or mating plane of the upper block portion of the disconnect.

I claim as my invention:

1. A translatable disconnect support unit for aircraft usage and for attachment with the lower block portion of a disconnect for aircraft personnel, said support unit comprising in combination, a rounded bottom rockable support frame having a substantially hollow interior and a plurality of spaced apart passageways through the lower section thereof, a flat-topped base plate having means adapted for attachment of the support unit to the aircraft and removably holding said support frame in a rocking position thereon, a movable ball support member in an upper socket portion of said support frame, a plurality of spaced apart spacer-guide pins having rounded ends held by and extending between socket means in the lower face of said ball support member and in the top of said base plate, said pins extending through said passageways in said rounded bottom lower section of the support frame whereby the ball support member is held in parallel positioning with respect to the flat top portion of said base plate as said support frame has its top portion translate with respect to said base plate, a tubular form of disconnect support stem held by and extending axially through the center portion of said ball support member, and a wide-mouthed tapered inlet opening within the upper portion of said support stem whereby to provide for the guiding of a removable upper disconnect portion into alignment with a lower disconnect portion that is held by said support stem.

2. A translatable disconnect support unit for aircraft usage and for attachment with the lower block portion of a disconnect for aircraft personnel, said support unit comprising in combination, a flat-topped base plate having means adapted for attachment of the unit to the aircraft, a rounded bottom rockable support frame having a substantially hollow interior and a plurality of spaced apart passageways through the lower section thereof, a movable ball support member in an upper socket portion of said support frame, a flange extending peripherally around the lower section of said support frame, a circumscribing retaining flange on said base plate extending around a spaced distance above said flange on the lower section of said support frame, spring means positioned between the upper face of said flange on said support frame and the lower face of said retaining flange whereby said frame is maintained in a position normal to said base plate, spacer-guide pins having rounded ends held by and extending between socket means in the lower face of said ball support member and in the top of said flat-topped base plate, said pins extending through said passageways in said rounded bottom lower section of the support frame, whereby the face of said ball support member is held in parallel positioning with respect to the top of said base plate as said support frame has its top portion translate with respect to said base plate, a tubular form of disconnect support stem held by and extending axially through the center portion of said ball support member, and a wide-mouthed tapered inlet opening within the upper portion of said support stem whereby to provide for the guiding of a removable upper disconnect portion into alignment with a lower disconnect portion that is held by said support stem.

3. The support unit of claim 2 further characterized in that said spring means between the flange on the lower section of said support frame and the retaining flange on said base plate is of the wave-form type of spring to effect equalization and normal vertical positioning of said support frame with respect to said flat-topped portion of said base plate.

4. The support unit of claim 2 further characterized in that the interior upper portion of said support stem is provided with recess means to accommodate an outwardly movable locking means from an external source, and vertically movable pin means in said support stem has upper end means to initiate the locking of said external movable locking means into said recess means.

References Cited by the Examiner

UNITED STATES PATENTS

| | | | |
|---|---|---|---|
| 1,182,472 | 5/1916 | Frye | 248—180 |
| 1,796,106 | 3/1931 | Johnson | 287—87 X |
| 2,440,211 | 4/1948 | Rothweiler | 248—180 |

CHANCELLOR E. HARRIS, *Primary Examiner.*

R. P. SEITTER, *Assistant Examiner.*